United States Patent
Tzao et al.

(10) Patent No.: US 9,824,434 B2
(45) Date of Patent: Nov. 21, 2017

(54) SYSTEM AND METHOD FOR OBJECT RECOGNITION

(71) Applicant: Industrial Technology Research Institute, Hsinchu (TW)

(72) Inventors: Szu-Han Tzao, Taoyuan (TW); Yue-Min Jiang, New Taipei (TW); Chih-Jen Hsu, Hsinchu County (TW); Ho-Hsin Lee, Hsinchu (TW); Tsai-Ya Lai, New Taipei (TW); Duan-Yu Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/973,676

(22) Filed: Dec. 17, 2015

(65) Prior Publication Data
US 2017/0053393 A1    Feb. 23, 2017

Related U.S. Application Data

(60) Provisional application No. 62/206,317, filed on Aug. 18, 2015.

(51) Int. Cl.
*G06K 9/00* (2006.01)
*G06T 7/00* (2017.01)
(Continued)

(52) U.S. Cl.
CPC ........ *G06T 7/0004* (2013.01); *G06F 17/3028* (2013.01); *G06F 17/30259* (2013.01);
(Continued)

(58) Field of Classification Search
None
See application file for complete search history.

(56) References Cited

U.S. PATENT DOCUMENTS

2010/0173269 A1*    7/2010  Puri ................... G09B 19/0092
                                                   434/127
2011/0273558 A1    11/2011  Subbiah et al.
(Continued)

FOREIGN PATENT DOCUMENTS

| CN | 102410828 | 4/2012 |
| CN | 104568824 | 4/2015 |
| CN | 104778374 | 7/2015 |

OTHER PUBLICATIONS

"Office Action of Taiwan Counterpart Application", dated Dec. 16, 2016, p. 1-p. 6.
"Office Action of Taiwan Counterpart Application," dated Mar. 20, 2017, p. 1-p. 6.

*Primary Examiner* — Vikkram Bali
(74) *Attorney, Agent, or Firm* — JCIPRNET (57) ABSTRACT

A system for object recognition includes an image/spectrum sensing device, to fetch an object image from a real object and sense spectra at sensing regions of the real object. A fetching module obtains a real-object image feature pattern for each ROI of the object image. An analyzing module for object image feature searches for a first candidate object from data bank and analyzes a correlation between the real object and candidate object. A fetching module for object spectrum feature obtains a real-object spectrum pattern for each ROI of the object image. An analyzing module for object spectrum feature is to search for a second candidate object from data bank and to further analyze a match level between the real-object and the second candidate object. A fusion module further analyzes information of image feature and spectrum feature find whether or not having a matched object as an identify object.

20 Claims, 9 Drawing Sheets

(51) Int. Cl.
*G06K 9/46* (2006.01)
*G06K 9/62* (2006.01)
*G06T 7/40* (2017.01)
*G06F 17/30* (2006.01)
*G06T 7/73* (2017.01)

(52) U.S. Cl.
CPC ............ *G06K 9/46* (2013.01); *G06K 9/6215* (2013.01); *G06K 9/6267* (2013.01); *G06K 9/6293* (2013.01); *G06T 7/40* (2013.01); *G06T 7/73* (2017.01); *G06K 2009/4666* (2013.01); *G06K 2209/17* (2013.01); *G06T 2207/30128* (2013.01)

(56) References Cited

U.S. PATENT DOCUMENTS

| | | | |
|---|---|---|---|
| 2015/0036138 A1* | 2/2015 | Watson | G01N 21/31 356/402 |
| 2015/0168365 A1* | 6/2015 | Connor | G01N 33/02 356/51 |
| 2015/0228062 A1* | 8/2015 | Joshi | G06Q 50/12 382/110 |
| 2016/0012749 A1* | 1/2016 | Connor | G09B 5/00 600/13 |
| 2016/0034764 A1* | 2/2016 | Connor | G06K 9/00771 348/158 |

\* cited by examiner

SYSTEM AND METHOD FOR OBJECT RECOGNITION

CROSS-REFERENCE TO RELATED APPLICATION

This application claims the priority benefits of U.S. provisional application Ser. No. 62/206,317, filed on Aug. 18, 2015. The entirety of the above-mentioned patent application is hereby incorporated by reference herein and made a part of this specification.

BACKGROUND OF THE INVENTION

1. Technical Field

The present invention generally relates to object recognition, in particular, to object recognition by fusion of image and spectrum.

2. Background

In recent years, food recognition techniques have attracted a lot of attention due to the emerging personal healthcare. However, image-based food recognition is a challenging task because of the variety of food's appearance even though images captured from the same food class. In this work, instead of the use of feature-based approach, patch-based visual appearance is employed directly.

Visual-based food recognition is one of the emerging applications of object recognition technology, because it will help estimate food calories and analyze people's eating habits for personal healthcare. Therefore, several works have been developed so far. Research in the computer vision community has explored the recognition of either a small sub-set of food types in controlled laboratory environments or food images obtained from the web. However, there have been only a few implemented systems that address the challenge of food recognition from images captured in real world environment. Moreover, most of them employed feature-based approach. This kind of method works well in constrained environment. However, the difficult thing of this kind of method is to find an invariant feature that is robust to distinct kinds of visual appearance resulted from different food placement.

SUMMARY

The disclosure is directed to a technique of food recognition based on combination of image and spectrum of food. The precision to recognize the real object, such as food, can be improved.

In an exemplary embodiment, the disclosure provides a system for object recognition. The system comprises an image/spectrum sensing device, a data bank of object image feature, a data bank of object spectrum feature, a fetching module for object image feature, an analyzing module for object image feature, a fetching module for object spectrum feature, an analyzing module for spectrum image feature, and a fusion module. The image/spectrum sensing device is to fetch an object image from a real object and sense spectra at a plurality of sensing regions of the real object with respect to the object image. The data bank of object image feature stores a plurality of image feature patterns corresponding to various first object samples, wherein each of the object samples is identified by a patch and the patch is formed by an atom array, wherein each of the image feature patterns is a sparse code representing an image information of multiple featuring atoms distributed in corresponding one of the patches. The data bank of object spectrum feature stores a plurality of spectrum feature patterns corresponding to various second object samples. The fetching module for object image feature is coupled to the data bank of object image feature and to obtain a real-object image feature pattern for each region-of-interest (ROI) of the object image. The analyzing module for object image feature is to search for at least one first candidate object for each ROI from the image feature patterns based on the sparse codes of the patches and to analyze a correlation between the real-object image feature pattern and each of the at least one candidate image feature pattern and give a weight and output a first information about the at least one first candidate object. The fetching module for object spectrum feature, coupled to the data bank of object spectrum feature, is to obtain a real-object spectrum pattern for each ROI of the object image. The analyzing module for object spectrum feature is to search for at least one second candidate object of each ROI from the spectrum feature patterns and to further analyze a match level of spectrum between the real-object spectrum pattern and each of the spectrum feature patterns of the at least one second candidate object and give each of the at least one second candidate object by a weight and output a second information about the at least one second candidate object. The fusion module is to analyze the first information and the second information to determine whether or not at least one identified object exits in the first information and the second information to identify the real object.

In an exemplary embodiment, the disclosure provides a method for object recognition. The method comprises providing an image/spectrum sensing device, providing a data bank of object image feature, providing a data bank of object spectrum feature, providing a fetching module for object image feature, providing an analyzing module for object image feature, providing a fetching module for object spectrum feature, providing an analyzing module for spectrum image feature, and providing a fusion module. The image/spectrum sensing device performs to fetch an object image from a real object and sense spectra at a plurality of sensing regions of the real object with respect to the object image. The data bank of object image feature performs to store a plurality of image feature patterns corresponding to various first object samples, wherein each of the object samples is identified by a patch and the patch is formed by an atom array, wherein each of the image feature patterns is a sparse code representing an image information of multiple featuring atoms distributed in corresponding one of the patches. The data bank of object spectrum feature performs to store a plurality of spectrum feature patterns corresponding to various second object samples. The fetching module for object image feature is coupled to the data bank of object image feature and to obtain a real-object image feature pattern for each region-of-interest (ROI) of the object image. The analyzing module for object image feature perfoms to search for at least one first candidate object for each ROI from the image feature patterns based on the sparse codes of the patches and to analyze a correlation between the real-object image feature pattern and each of the at least one candidate image feature pattern and give a weight and output a first information about the at least one first candidate object. The fetching module for object spectrum feature is coupled to the data bank of object spectrum feature and to obtain a real-object spectrum pattern for each ROI of the object image. The analyzing module for object spectrum feature performs to search for at least one second candidate object of each ROI from the spectrum feature patterns and to further analyze a match level of spectrum between the real-object spectrum pattern and each of the spectrum feature patterns of the at least one second candidate object and give each of the at least one second candidate object by a weight and output a second information about the at least one second candidate object. The fusion module performs to analyze the first information and the second information to determine whether or not at least one identified object exits in the first information and the second information to identify the real object.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

The disclosure is directed to a system and a method of object recognition based on combination of image and spectrum of object, such as food. The image recognition uses a sparse code as a patch to represent one object category. Since both image feature and spectrum feature have been taken into account, the precision to recognize the real object can be improved.

Multiple exemplary embodiments are provided for description but not for limiting the disclosure.

In the disclosure, the term of "module" has been used to represent a circuit which may involve a software program for calculation and analysis. The "module" indeed is a structure not just a function block.

Figure 1:
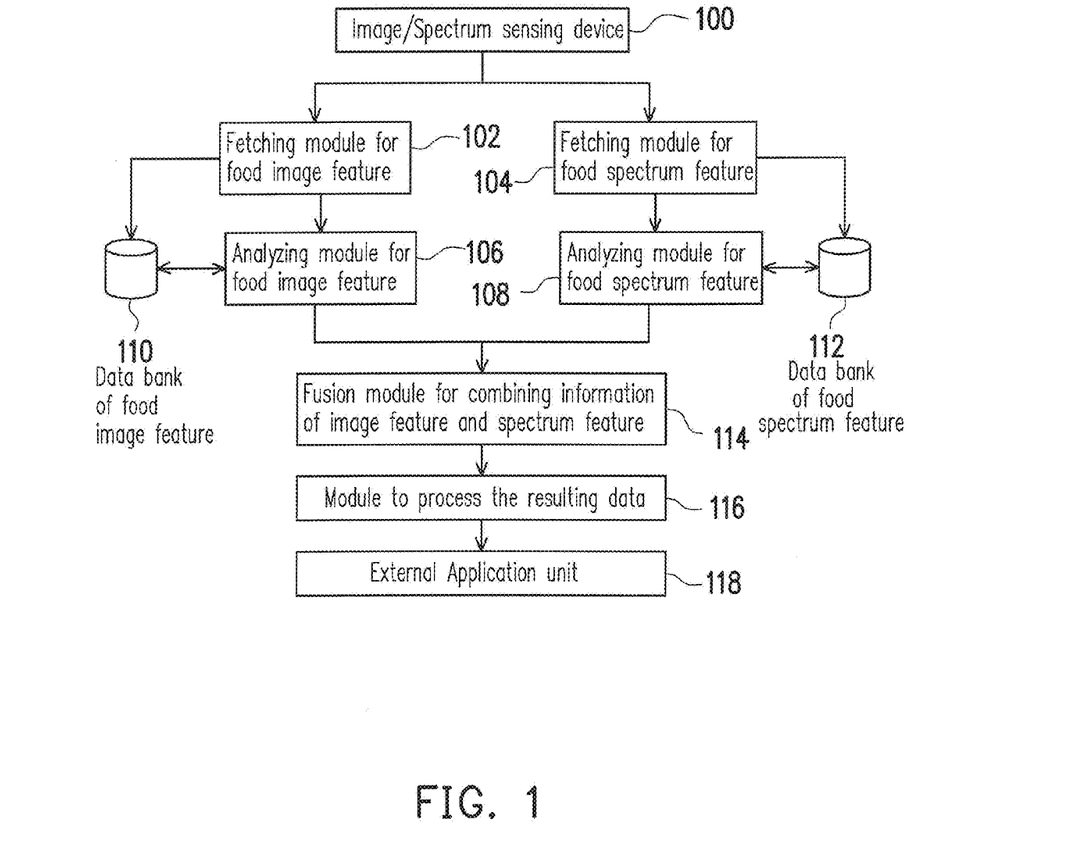
FIG. 1 is a drawing, schematically illustrating a system for food recognition, according to an exemplary embodiment of the disclosure.

FIG. 1 is a drawing, schematically illustrating a system for food recognition, according to an exemplary embodiment of the disclosure. Referring to FIG. 1, the system for food recognition, taken as an example for the object recognition, includes an image/spectrum sensing device 100, a data bank of food image feature 110, a data bank of food spectrum feature 112, a fetching module for food image feature 102, an analyzing module for food image feature 106, a fetching module for food spectrum feature 104, an analyzing module for spectrum image feature 108, and a fusion module 114. Further, the system may also include a module 116 to process the resulting data after food has been identified. For the application, the result can also be passed to an external application unit 118 for any suitable application as intended.

Generally, the image/spectrum sensing device 100 is to fetch a food image from a real food and sense spectra at a plurality of sensing regions of the real food with respect to the food image. Here, the image and the spectrum of food may be taken separately or integrated by a single sensing head.

Figure 2A:
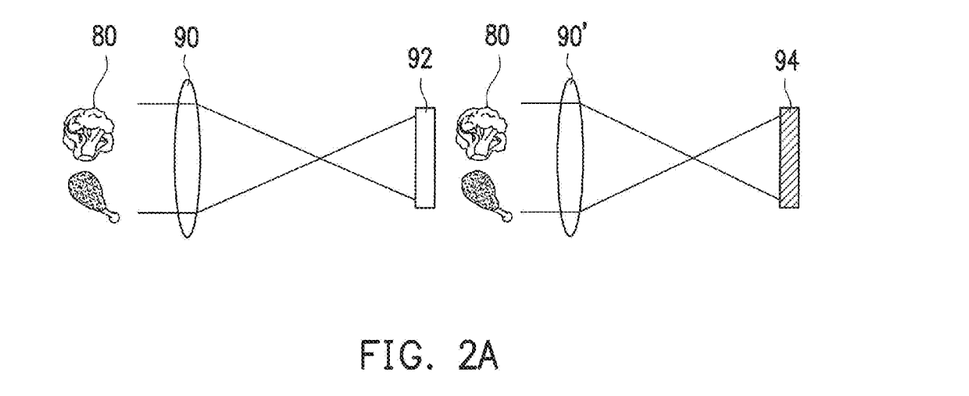
FIG. 2A is a drawing, schematically illustrating an image/spectrum sensing device, according to an exemplary embodiment of the disclosure.

FIG. 2A is a drawing, schematically illustrating an image/spectrum sensing device, according to an exemplary embodiment of the disclosure. Referring to FIG. 1 and FIG. 2A, the image/spectrum sensing device includes an image sensing array 92 corresponding to an objective lens 90 and a spectrum sensing array 94 corresponding to the objective lens 90'. Thus, the image on real food 80 and the spectra on real food 80 are taken independently. However, the spectra are corresponding to multiple regions of the real food 80 and would be matched to the image in space.

Figure 2B:
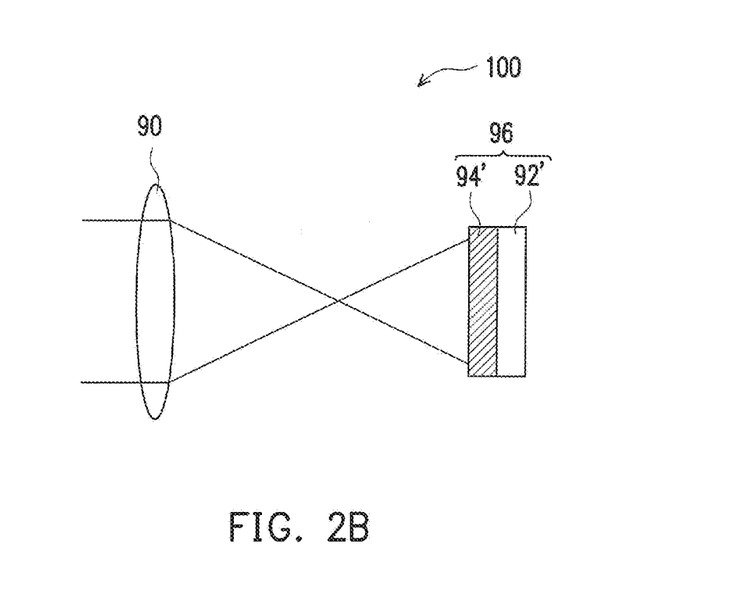
FIG. 2B is a drawing, schematically illustrating an image/spectrum sensing device, according to an exemplary embodiment of the disclosure.

Alternatively, the image and the spectrum of food may be integrated. FIG. 2B is a drawing, schematically illustrating an image/spectrum sensing device, according to an exemplary embodiment of the disclosure. Referring to FIG. 1 and FIG. 2B, the image sensing array 92' and the spectrum sensing array 94' are integrated as sensing device 96. The image/spectrum sensing device 100 includes an image sensing array 92' and a spectrum sensing array 94', which are stacked together and matched pixel to pixel as an example. However, the resolution of the spectrum sensing array 94' may be smaller than the resolution of the image sensing array 92', as another exemplary embodiment. Then, it is not necessary to match by pixel to pixel but the location of the spectrum where been taken can be relatively matched to the location in the image. Further, as to the match by pixel to pixel, it can be done by hardware or software. In this embodiment, the spectrum sensing array 94' and the image sensing array 92' are stacked together, so the geometric locations of the sensors of the spectrum sensing array 94' with respect to the image sensing array 92' can be precisely known. The match between the two arrays can be easily and precisely matched either by hardware or by software. Each pixel of the spectrum sensing array 94' produces a spectrum in wavelength.

Still referring to FIG. 1, the data bank of food image feature 110 stores a plurality of image feature patterns corresponding to various first food samples used for image recognition. Here, please also referring to FIG. 7 beforehand, each of the food samples 500 is identified by a patch 502 and the patch 502 is formed by an atom array. The atoms are the sparse locations for each kind of food to represent the feature pattern of the specific food. The atoms in each patch 502 form a sparse code. Different food of different patch 502 has different sparse code. In other words, each of the image feature patterns is a sparse code to represent an image information of multiple featuring atoms distributed in corresponding one of the patches. The image information may be a color information as an example.

Referring back to FIG. 1, the data bank of food spectrum feature 112 stores a plurality of spectrum feature patterns corresponding to various second food samples.

The fetching module for food image feature 102 is coupled to the data bank of food image feature and to obtain a real-food image feature pattern for each region-of-interest (ROI) of the food image. Each ROI is corresponding to one region where a food may exist to be identified. Here in the ROI, the food may be dominated by one kind of food or mixed by multiple kinds of food, or even may have no food. Usually, several kinds of foods are put together and shot by the image sensing array 92'. According to the image processing in the art with the searching algorithm for food, the possibly boundary of the food can be identified to form one ROI. The disclosure does not limit to a specific method to determine the food ROI. According to the sparse code of each kind of foods, one food ROI would be verified with multiple sparse codes corresponding to various food samples, such as 25 food samples.

The fetching module for food spectrum feature 104 is coupled to the data bank of food spectrum feature 112 and to obtain a real-food spectrum pattern for each ROI of the food image.

Figure 3:
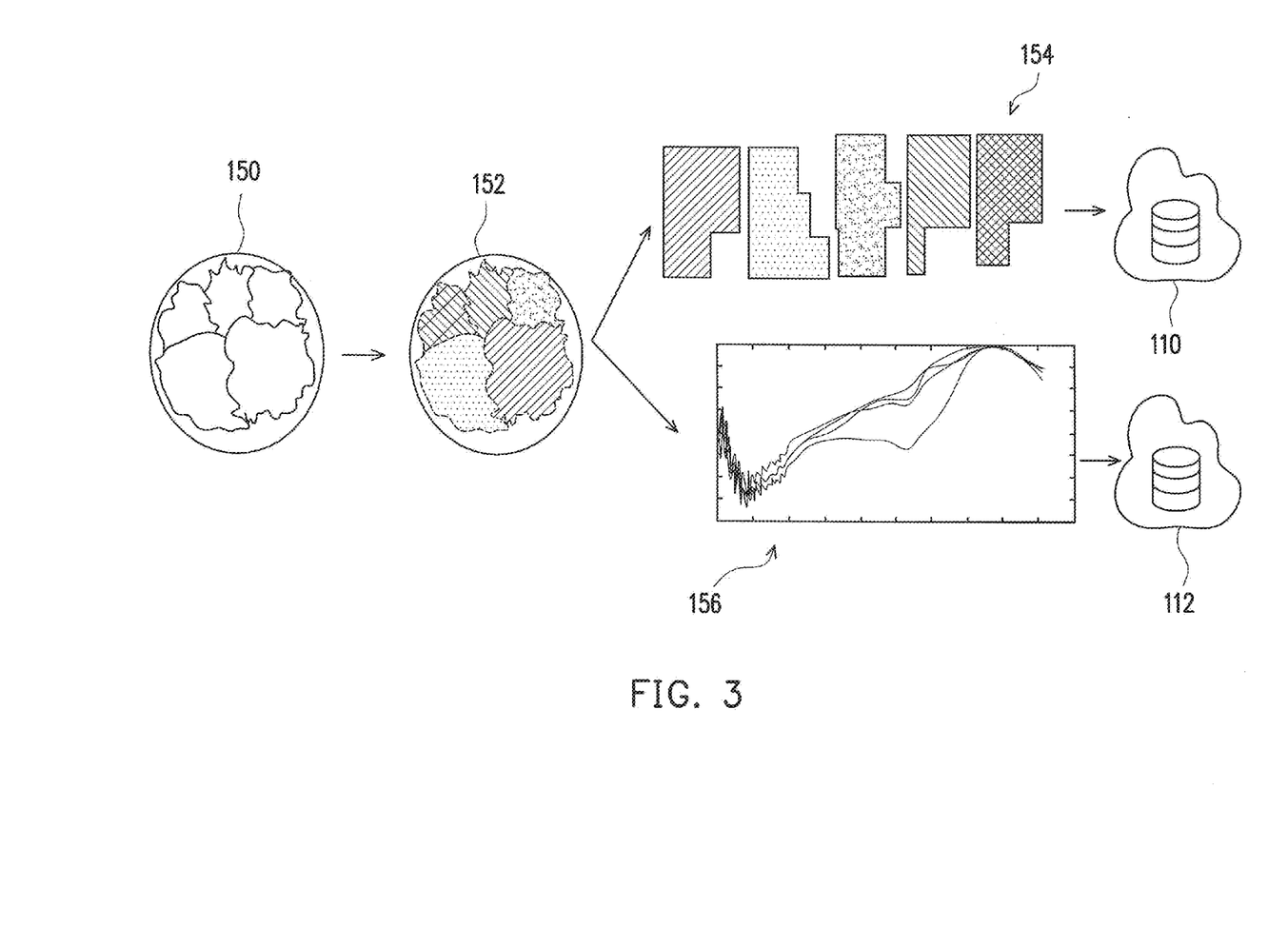
FIG. 3 is a drawing, schematically illustrating a mechanism to search for candidate food in preliminary stage, according to an exemplary embodiment of the disclosure.

FIG. 3 is a drawing, schematically illustrating a mechanism to search for candidate food in preliminary stage, according to an exemplary embodiment of the disclosure. Further also referring to FIG. 3 with FIG. 1, in an example, the meal 150 may contain five foods, which image has been processed to identify five ROIs as shown in image 152. Each ROI may also have one spectrum or more as the representation. Five ROIs are transformed into five atoms arrays 154 in image search and have five representative spectrum patterns 156. Then, the analyzing module for food image feature 106 is to search for at least one first candidate food for each ROI from the image feature patterns based on the sparse codes of the patches to obtain preliminary results.

The analyzing module for food image feature 106 can further analyze a correlation between the real-food image feature pattern and each of the at least one candidate image feature pattern and give a weight and output a first information about the at least one first candidate food.

The analyzing module for food spectrum feature 108 to search for at least one second candidate food of each ROI from the spectrum feature patterns and to further analyze a match level of spectrum between the real-food spectrum pattern and each of the spectrum feature patterns of the at least one second candidate food and give each of the at least one second candidate food by a weight and output a second information about the at least one second candidate food.

The fusion module 114 is to analyze the first information and the second information to determine whether or not at least one identified food exits in the first information and the second information to identify the real food.

Figure 4:
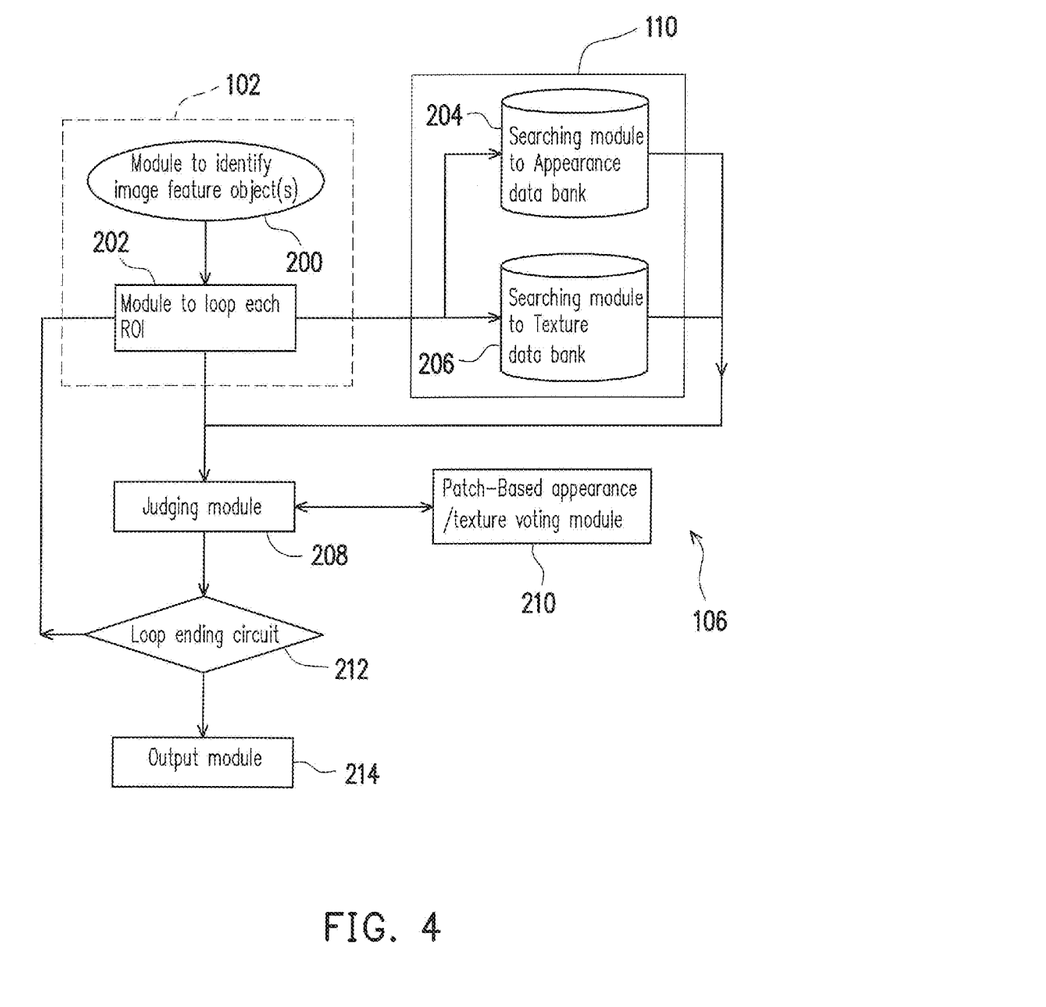
FIG. 4 is a drawing, schematically illustrating an analyzing module for food image feature, according to an exemplary embodiment of the disclosure.

FIG. 4 is a drawing, schematically illustrating an analyzing module for food image feature, according to an exemplary embodiment of the disclosure. Referring to FIG. 1 and FIG. 4, the fetching module for food image feature 102 for food image feature loops each ROI and the analyzing module for food image feature 106 subsequently analyzes each ROI. The fetching module for food image feature 102 in an exemplary embodiment includes a module 200 to identify image feature object(s) and a module 202 to loop each ROI and compare the image feature.

The analyzing module for food image feature 106 includes a searching module 203, searching for the at least one first candidate food from the data bank of food image feature. The searching module 203 in an example includes an appearance searching module 204 and a texture searching module 206 for analyzing food appearance and food texture. A judging module 208 serves as an analyzing kernel operation, receiving an information of the at least one first candidate food. A patch-based appearance/texture voting module 210, coupled to the judging module 208 in communication to further analyze between the real food and the at least one candidate food based on the sparse code of the patch.

The patch-based appearance/texture voting module 210 transforms all atoms of all patches into an atom feature vector by a support vector machine (SVM) to identify the at least one first candidate food based on atom distribution of the atom feature vector.

Further, a loop ending circuit 212 for a loop back to the module 202 when any ROI is still not identified with food. After all ROIs have been identified with food, the essential information has been output by the output module 214.

Further, the food result may be used to train the food samples in the data bank of food image feature 110.

Figure 5:
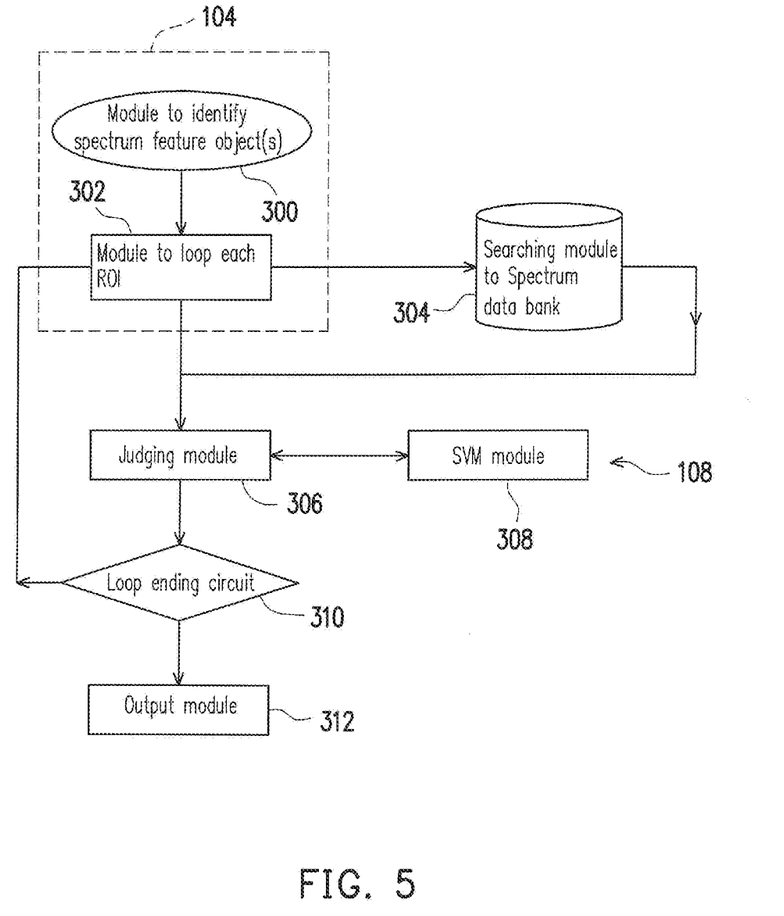
FIG. 5 is a drawing, schematically illustrating an analyzing module for food spectrum feature, according to an exemplary embodiment of the disclosure.

FIG. 5 is a drawing, schematically illustrating an analyzing module for food spectrum feature, according to an exemplary embodiment of the disclosure. Referring to FIG. 1 and FIG. 5, the fetching module for food spectrum feature 104 also loops each ROI and the analyzing module for food spectrum feature 108 subsequently analyzes each ROI. The fetching module for food spectrum feature 104 in an exemplary embodiment includes a module 300 to identify spectrum feature object(s) and a module 302 to loop each ROI and compare the spectrum feature. The analyzing module for spectrum image feature 108 includes a searching module 304, searching for multiple preliminary candidate foods from the data bank of food spectrum feature 112 based on a spectrum comparison mechanism. The spectrum comparison mechanism includes a shape matching comparison.

A judging module 306 serves as an analyzing kernel to handle the operation. A support vector machine (SVM) module 308 is coupled to the judging module to further identify the preliminary candidate foods to obtain the at least one second candidate food and gives the weight to the at least one second candidate food.

When the at least one second candidate food includes multiple different foods but the spectrum feature patterns thereof are similar, at least one feature region of each of the spectrum feature patterns are expanded for further distinction with fine feature.

Further, a loop ending circuit 310 for a loop back to the module 302 when any ROI is still not identified with food. After all ROIs have been identified with food, the essential information has been output by the output module 312.

Figure 6:
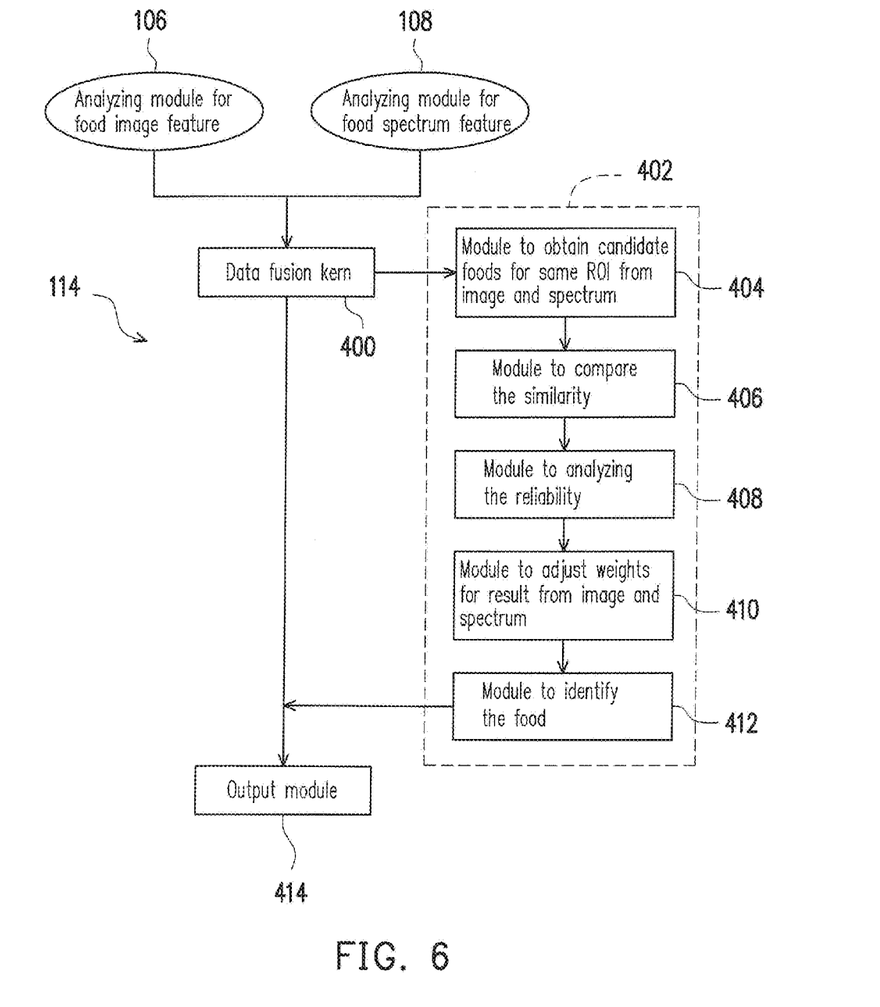
FIG. 6 is a drawing, schematically illustrating a fusion module for combining information of image feature and spectrum feature, according to an exemplary embodiment of the disclosure.

FIG. 6 is a drawing, schematically illustrating a fusion module for combining information of image feature and spectrum feature, according to an exemplary embodiment of the disclosure. Referring to FIG. 6, the fusion module 114 includes a data fusion kernel 400 to generally handle a data fusion from the first information and the second information. A process module 402 is coupled to the data fusion kernel, to analyze a similarity in probability of food category crossing check between the first information and the second information and identify the real food. After fusing the information, all results are output via the output module 414, which communicates with a module to process the resulting data 116.

Further, the food result may be used to train the food samples in the data bank of food spectrum feature 112.

The process module 402 in an example includes a first module 404, coupled to the data fusion kernel to obtain the at least one first candidate foods and the at least one second candidate food for a same ROI. A second module 406 is coupled to the first module to find a similarity between the at least one first candidate foods and the at least one second candidate food. A third module 408 is coupled to the second module to analyzing a reliability based on image feature or spectrum feature. A fourth module 410 is coupled to the third module to adjust weight for the at least one first candidate foods and the at least one second candidate food. A fifth module 412 is coupled to the fourth module 410, to identify the real food.

Figure 7:
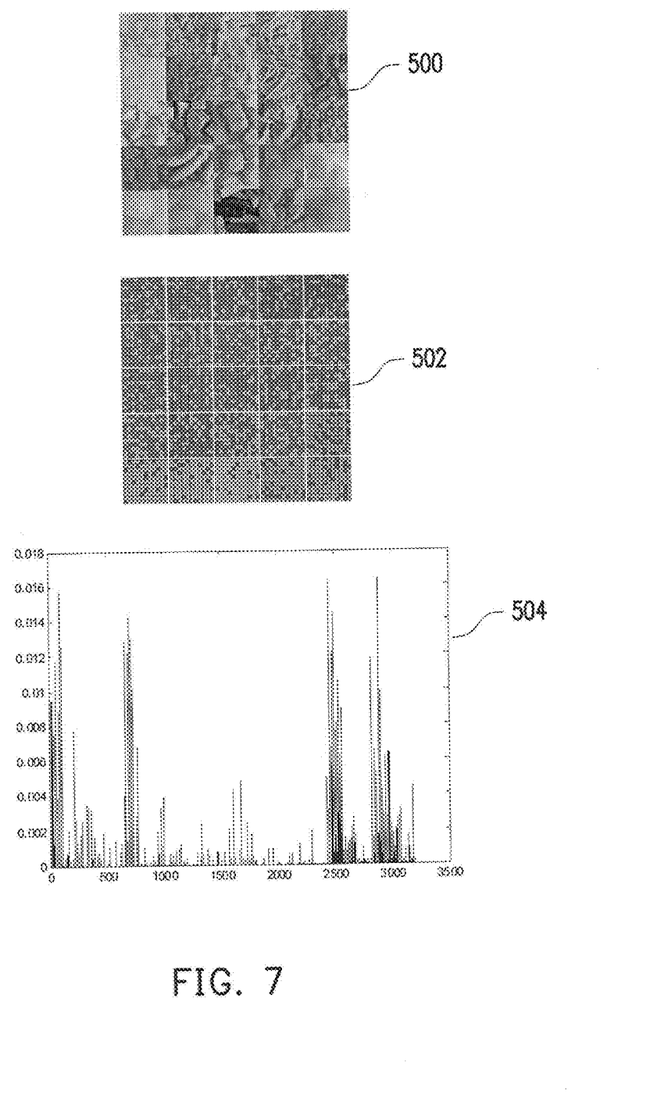
FIG. 7 is a drawing, schematically illustrating a mechanism to search for candidate food based on food patches, according to an exemplary embodiment of the disclosure.

FIG. 7 is a drawing, schematically illustrating a mechanism to search for candidate food based on food patches, according to an exemplary embodiment of the disclosure. Referring to FIG. 7, the disclosure uses the food patch with the atom array to recognize food. The mechanism is described in better detail as follows. The food samples in the data bank of food image feature 110 may have 25 kinds of food samples 500 for consideration. Based on the experiments, each food sample 500, based on appearance and texture, is represented by one patch 502, which is formed by atoms as shown by little squares. The atoms are the most feature parts with respect to the specific food sample. Each atom is a code. The atoms are sparse over the food sample. The sparse code in one patch 502 represents the specific food.

The patch-based appearance/texture voting module 210 transforms all atoms of all patches into an atom feature vector by a support vector machine (SVM) to identify the at least one second candidate food based on atom distribution of the atom feature vector. The atom probability distribution of the all atoms of the 25 patches forms a histogram 504 as shown in light shading bins. Each peak represents one king of food sample. The histogram of atom probability distribution of the food to be recognized is shown in dark shading bins to see whether or not any match to the peaks.

Figure 8:
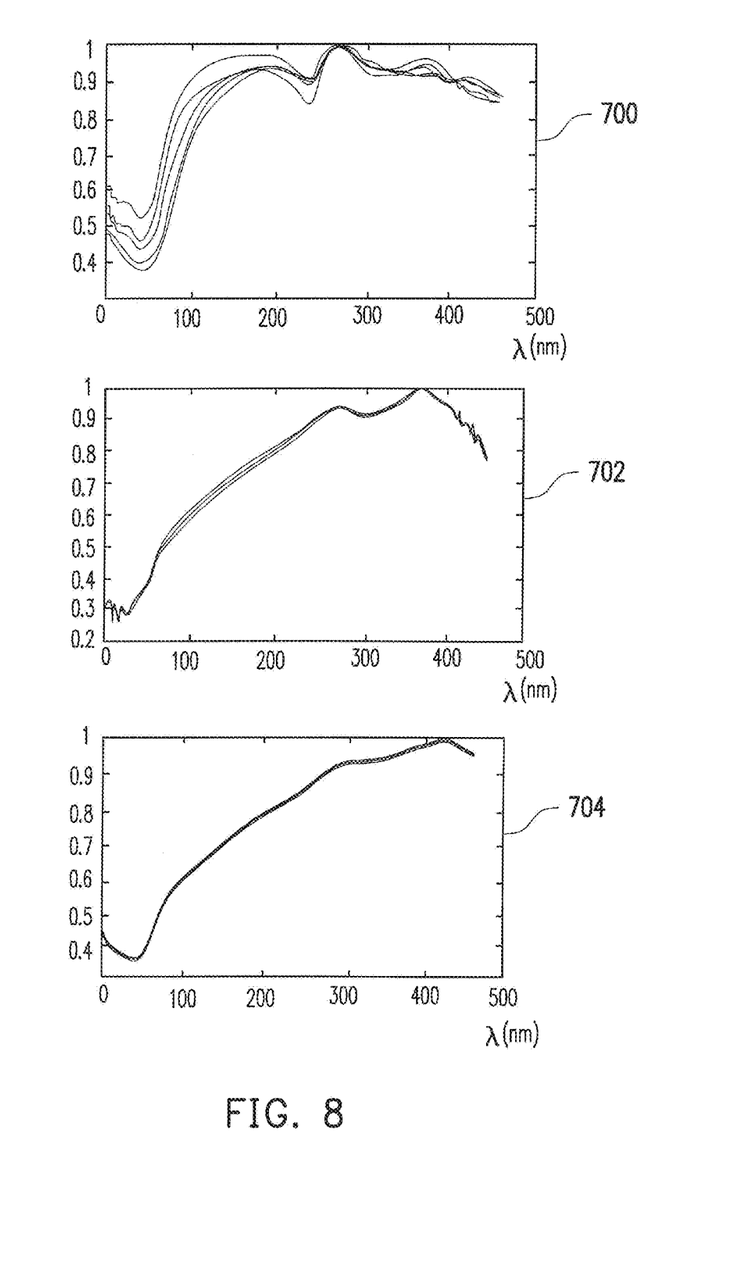
FIG. 8 is a drawing, schematically illustrating spectrum feature patterns of food sample, according to an exemplary embodiment of the disclosure.

FIG. 8 is a drawing, schematically illustrating spectrum feature patterns of food sample, according to an exemplary embodiment of the disclosure. Referring to FIG. 8, several food spectrum patterns, such as 5 spectra, for each food sample are taken and stored in the data bank of food spectrum feature 112. In FIG. 8, only three food samples, such as apple, noodle and cake, with the food spectrum patterns 700, 702, 704 are shown, in which some food same may be similar in rough level.

Figure 9:
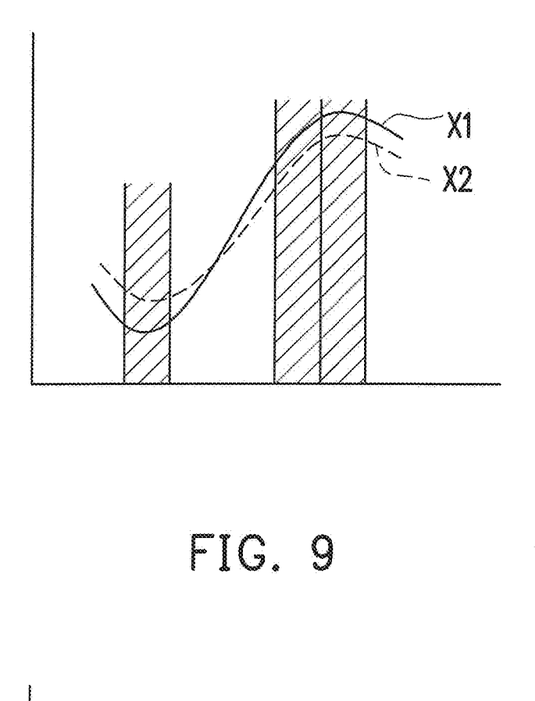
FIG. 9 is a drawing, schematically illustrating a mechanism to verify candidate food based on spectrum with expanding manner, according to an exemplary embodiment of the disclosure.
Figure 10:
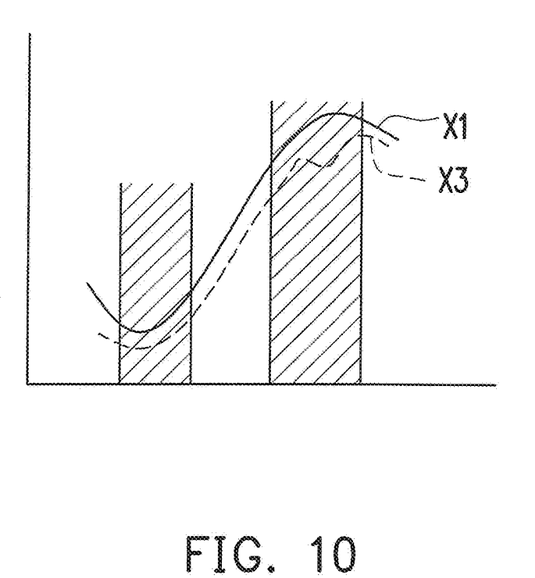
FIG. 10 is a drawing, schematically illustrating a mechanism to verify candidate food based on spectrum with expanding manner, according to an exemplary embodiment of the disclosure.

FIG. 9 is a drawing, schematically illustrating a mechanism to verify candidate food based on spectrum with expanding manner, according to an exemplary embodiment of the disclosure. FIG. 10 is a drawing, schematically illustrating a mechanism to verify candidate food based on spectrum with expanding manner, according to an exemplary embodiment of the disclosure.

Referring to FIG. 9 and FIG. 10, the spectrum feature pattern indicated by X1 is from the real food to be recognized. The spectrum feature pattern indicated by X2 and X3 for candidate foods, such as noodle in FIG. 9 and cake in FIG. 10, have been searched out from the data bank of food spectrum feature 112. Because the spectrum feature patterns X2 and X3 are similar to the spectrum feature pattern X1, the noodle and cake have been preliminarily searched out as the candidate foods.

In order to distinct the noodle and the cake, noodle in FIG. 9 has one or multiple feature regions, which has stronger capability to represent noodle. Likewise, the cake also has one or multiple feature region with stronger capability to represent cake. The spectrum information the feature regions has been expanded. As a result, the fine feature of the noodle and cake can be further precisely distinct. Here, the fine feature is used to further verification. However, if only one candidate food is found, then the procedure to check fine feature may be skipped or just be performed for verification. In addition, a further image verification on the candidate foods, such as color information, may also be used for double confirmation. In this example, the spectrum feature patterns X2 of noodle has higher probability or weight than the spectrum feature patterns X3 of cake.

As to training in two kinds of data banks, the recognized food items can be verified by the user to respond the correctness of recognition. After sufficient samples in statistic manner, the results can be used to adjust the image/spectrum feature patterns of the food samples.

Further, in case, one of the spectrum-based result and the patch-based result is correct in recognition and the other one is wrong in recognition. After sufficient statistic, to this specific real food, the one often has the correct recognition can get higher reliability weight.

However, the training mechanism is not just limited to the examples above.

Further, the disclosure takes the food as the sample to be recognized but not for limitation. The similar mechanism can be applied to recognize other interested objects without limiting to food recognition.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for object recognition, comprising:
an image/spectrum sensing device, to fetch an object image from a real object and sense spectra at a plurality of sensing regions of the real object with respect to the object image;
a data bank of object image feature, storing a plurality of image feature patterns corresponding to various first object samples, wherein each of the object samples is identified by a patch and the patch is formed by an atom array, wherein each of the image feature patterns is a sparse code representing an image information of multiple featuring atoms distributed in corresponding one of the patches;
a data bank of object spectrum feature, storing a plurality of spectrum feature patterns corresponding to various second object samples;
a fetching module for object image feature, coupled to the data bank of object image feature to obtain a real-object image feature pattern for each region-of-interest (ROI) of the object image;
an analyzing module for object image feature, to search for at least one first candidate object for each ROI from the image feature patterns based on the sparse codes of the patches and to analyze a correlation between the real-object image feature pattern and each of the at least one candidate image feature pattern and give a weight and output a first information about the at least one first candidate object;

a fetching module for object spectrum feature, coupled to the data bank of object spectrum feature, to obtain a real-object spectrum pattern for each ROI of the object image;

an analyzing module for object spectrum feature, to search for at least one second candidate object of each ROI from the spectrum feature patterns and to further analyze a match level of spectrum between the real-object spectrum pattern and each of the spectrum feature patterns of the at least one second candidate object and give each of the at least one second candidate object by a weight and output a second information about the at least one second candidate object; and a fusion module, to analyze the first information and the second information to determine whether or not at least one identified object exits in the first information and the second information to identify the real object.

2. The system for object recognition according to claim 1, wherein the image/spectrum sensing device comprises an image sensing array and a spectrum sensing array, the image sensing array and the spectrum sensing array are stacked together and matched in relative location.

3. The system for object recognition according to claim 1, wherein the fetching module for object image feature loops each ROI and the analyzing module for object image feature subsequently analyzes each ROI, wherein the analyzing module for object image feature comprises:

a searching module, searching for the at least one first candidate object from the data bank of object image feature;

a judging module, serving as an analyzing kernel operation, receiving an information of the at least one first candidate object; and a patch-based appearance/texture voting module, coupled to the judging module to further analyze between the real object and the at least one candidate object based on the sparse code of the patch.

4. The system for object recognition according to claim 3, wherein the searching module includes an appearance searching module and a texture searching module for analyzing object appearance and object texture.

5. The system for object recognition according to claim 3, wherein the patch-based appearance/texture voting module transforms all atoms of all patches into an atom feature vector by a support vector machine (SVM) to identify the at least one second candidate object based on atom distribution of the atom feature vector.

6. The system for object recognition according to claim 1, wherein the fetching module for object spectrum feature also loops each ROI and the analyzing module for object spectrum feature subsequently analyzes each ROI, wherein the analyzing module for spectrum image feature comprises:

a searching module, searching for multiple preliminary candidate objects from the data bank of object spectrum feature based on a spectrum comparison mechanism;

a judging module, serving as an analyzing kernel; and a support vector machine (SVM) module, coupled to the judging module to further identify the preliminary candidate objects to obtain the at least one second candidate object and gives the weight to the at least one second candidate object.

7. The system for object recognition according to claim 6, wherein the spectrum comparison mechanism includes a shape matching comparison.

8. The system for object recognition according to claim 6, wherein when the at least one candidate object includes multiple different objects but the spectrum feature patterns thereof are similar, at least one feature region of each of the spectrum feature patterns are expanded for further distinction with fine feature.

9. The system for object recognition according to claim 1, wherein the fusion module comprises:

a data fusion kernel, to generally handle a data fusion from the first information and the second information; and a process module, coupled to the data fusion kernel, to analyze a similarity in probability of object category crossing check between the first information and the second information and identify the real object.

10. The system for object recognition according to claim 9, wherein the process module comprises:

a first module, coupled to the data fusion kernel to obtain the at least one first candidate objects and the at least one second candidate object for a same ROI;

a second module, coupled to the first module to find a similarity between the at least one first candidate objects and the at least one second candidate object;

a third module, coupled to the second module to analyzing a reliability based on image feature or spectrum feature;

a fourth module, coupled to the third module to adjust weight for the at least one first candidate objects and the at least one second candidate object; and a fifth module, coupled to the fourth module, to identify the real object.

11. A method for object recognition, comprising:

providing an image/spectrum sensing device, to fetch an object image from a real object and sense spectra at a plurality of sensing regions of the real object with respect to the object image;

providing a data bank of object image feature, storing a plurality of image feature patterns corresponding to various first object samples, wherein each of the object samples is identified by a patch and the patch is formed by an atom array, wherein each of the image feature patterns is a sparse code representing an image information of multiple featuring atoms distributed in corresponding one of the patches;

providing a data bank of object spectrum feature, storing a plurality of spectrum feature patterns corresponding to various second object samples;

providing a fetching module for object image feature, coupled to the data bank of object image feature to obtain a real-object image feature pattern for each region-of-interest (ROI) of the object image;

providing an analyzing module for object image feature, to search for at least one first candidate object for each ROI from the image feature patterns based on the sparse codes of the patches and to analyze a correlation between the real-object image feature pattern and each of the at least one candidate image feature pattern and give a weight and output a first information about the at least one first candidate object;

providing a fetching module for object spectrum feature, coupled to the data bank of object spectrum feature, to obtain a real-object spectrum pattern for each ROI of the object image;

providing an analyzing module for object spectrum feature, to search for at least one second candidate object of each ROI from the spectrum feature patterns and to further analyze a match level of spectrum between the real-object spectrum pattern and each of the spectrum feature patterns of the at least one second candidate object and give each of the at least one second candidate object by a weight and output a second information about the at least one second candidate object; and providing a fusion module, to analyze the first information and the second information to determine whether or not at least one identified object exits in the first information and the second information to identify the real object.

12. The method for object recognition according to claim 11, wherein the image/spectrum sensing device comprises an image sensing array and a spectrum sensing array, the image sensing array and the spectrum sensing array are stacked together and matched in relative location.

13. The method for object recognition according to claim 11, wherein the fetching module for object image feature loops each ROI and the analyzing module for object image feature subsequently analyzes each ROI, wherein the step of providing the analyzing module for object image feature comprises:

providing a searching module, searching for the at least one first candidate object from the data bank of object image feature;

providing a judging module, serving as an analyzing kernel operation, receiving an information of the at least one first candidate object; and providing a patch-based appearance/texture voting module, coupled to the judging module to further analyze between the real object and the at least one candidate object based on the sparse code of the patch.

14. The method for object recognition according to claim 13, wherein the searching module includes an appearance searching module and a texture searching module, for analyzing object appearance and object texture.

15. The method for object recognition according to claim 13, wherein the patch-based appearance/texture voting module transforms all atoms of all patches into an atom feature vector by a support vector machine (SVM) to identify the at least one second candidate object based on atom distribution of the atom feature vector.

16. The method for object recognition according to claim 11, wherein the fetching module for object spectrum feature also loops each ROI and the analyzing module for object spectrum feature subsequently analyzes each ROI, wherein the step of providing the analyzing module for spectrum image feature comprises:

providing a searching module, searching for multiple preliminary candidate objects from the data bank of object spectrum feature based on a spectrum comparison mechanism;

providing a judging module, serving as an analyzing kernel; and providing a support vector machine (SVM) module, coupled to the judging module to further identify the preliminary candidate objects to obtain the at least one second candidate object and gives the weight to the at least one second candidate object.

17. The method for object recognition according to claim 16, wherein the spectrum comparison mechanism includes a shape matching comparison.

18. The method for object recognition according to claim 16, wherein when the at least one candidate object includes multiple different objects but the spectrum feature patterns thereof are similar, at least one feature region of each of the spectrum feature patterns are expanded for further distinction with fine feature.

19. The method for object recognition according to claim 11, wherein the step of providing the fusion module comprises:

providing a data fusion kernel, to generally handle a data fusion from the first information and the second information; and providing a process module, coupled to the data fusion kernel, to analyze a similarity of object category between the first information and the second information and identify the real object.

20. The method for object recognition according to claim 19, wherein the step of providing the process module comprises:

providing a first module, coupled to the data fusion kernel to obtain the at least one first candidate objects and the at least one second candidate object for a same ROI;

providing a second module, coupled to the first module to find a similarity between the at least one first candidate objects and the at least one second candidate object;

providing a third module, coupled to the second module to analyzing a reliability based on image feature or spectrum feature;

providing a fourth module, coupled to the third module to adjust weight for the at least one first candidate objects and the at least one second candidate object; and providing a fifth module, coupled to the fourth module, to identify the real object.

* * * * *